United States Patent
Gehlsen

(10) Patent No.: US 9,096,331 B2
(45) Date of Patent: Aug. 4, 2015

(54) METHOD AND APPARATUS FOR SUPPORTING AN AIRCRAFT STRUCTURE DURING REPAIR

(71) Applicant: The Boeing Company, Chicago, IL (US)

(72) Inventor: Paul Ronald Gehlsen, Wilkeson, WA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 14/025,332

(22) Filed: Sep. 12, 2013

(65) Prior Publication Data

US 2015/0071754 A1   Mar. 12, 2015

(51) Int. Cl.
  *B64F 5/00*   (2006.01)
  *B66F 11/00*   (2006.01)

(52) U.S. Cl.
  CPC .............. *B64F 5/0081* (2013.01); *B66F 11/00* (2013.01)

(58) Field of Classification Search
  CPC ............. B66C 23/80; B66F 7/20; B64F 1/22; B64F 5/00; B64F 5/0081
  USPC ................ 254/89 R, 423, 426, 418; 212/296; 244/119, 139; 29/897.2; 414/785
  See application file for complete search history.

(56) References Cited

U.S. PATENT DOCUMENTS

| | | | | |
|---|---|---|---|---|
| 2,443,405 A | * | 6/1948 | Thompson | 187/205 |
| 2,712,874 A | * | 7/1955 | Murray | 414/743 |
| 2,803,360 A | * | 8/1957 | Straight, Jr. et al. | 254/89 H |
| 3,042,130 A | * | 7/1962 | Wiebe | 180/14.1 |
| 3,078,942 A | * | 2/1963 | Wiebe | 180/14.7 |
| 3,081,883 A | * | 3/1963 | Minty | 212/344 |
| 3,211,425 A | * | 10/1965 | Greulich et al. | 254/2 R |
| 3,433,459 A | * | 3/1969 | Logan | 254/281 |
| 3,489,297 A | * | 1/1970 | Jenkins et al. | 414/234 |
| 3,612,484 A | * | 10/1971 | Gallagher et al. | 414/785 |
| 3,706,285 A | * | 12/1972 | Gynt et al. | 104/124 |
| 4,378,098 A | * | 3/1983 | Evans | 244/137.1 |
| 4,626,012 A | * | 12/1986 | Weldele | 294/81.3 |
| 4,763,800 A | * | 8/1988 | Engler et al. | 212/195 |
| 4,921,074 A | * | 5/1990 | Ochs | 187/204 |
| 5,361,565 A | * | 11/1994 | Bayer | 254/292 |
| 6,257,371 B1 | * | 7/2001 | Wanner | 187/215 |
| 6,257,522 B1 | * | 7/2001 | Friend et al. | 244/118.1 |
| 7,546,929 B2 | * | 6/2009 | Wierzba et al. | 212/345 |
| 7,926,671 B2 | * | 4/2011 | Wierzba et al. | 212/316 |
| 8,066,252 B2 | * | 11/2011 | Murata et al. | 248/671 |
| 8,360,388 B1 | * | 1/2013 | Murata et al. | 248/671 |
| 8,393,598 B2 | * | 3/2013 | Sievers et al. | 254/418 |
| 2009/0078502 A1 | * | 3/2009 | Knurr | 182/13 |
| 2013/0014367 A1 | | 1/2013 | Miller et al. | |

* cited by examiner

*Primary Examiner* — Lee D Wilson
*Assistant Examiner* — Jamal Daniel
(74) *Attorney, Agent, or Firm* — Ostrager Chong Flaherty & Broitman P.C.

(57) ABSTRACT

Systems and methods for jacking an aircraft structure using beams coupled to seat tracks attached to a floor beam grid structure. Mechanical load distribution plates can have offset lift pin location to allow a certain percentage of the load to be applied to specific seat tracks. Different quantities of seat tracks can be utilized per requirements. Attachment rails that interface with the seat tracks use the same hardware that is used to fasten aircraft seats to the seat tracks. This helps handle the load and prevent damage to the seat tracks. The jacking apparatus also includes load swivels and a hanger link to prevent any side or twisting loads from being applied.

21 Claims, 9 Drawing Sheets

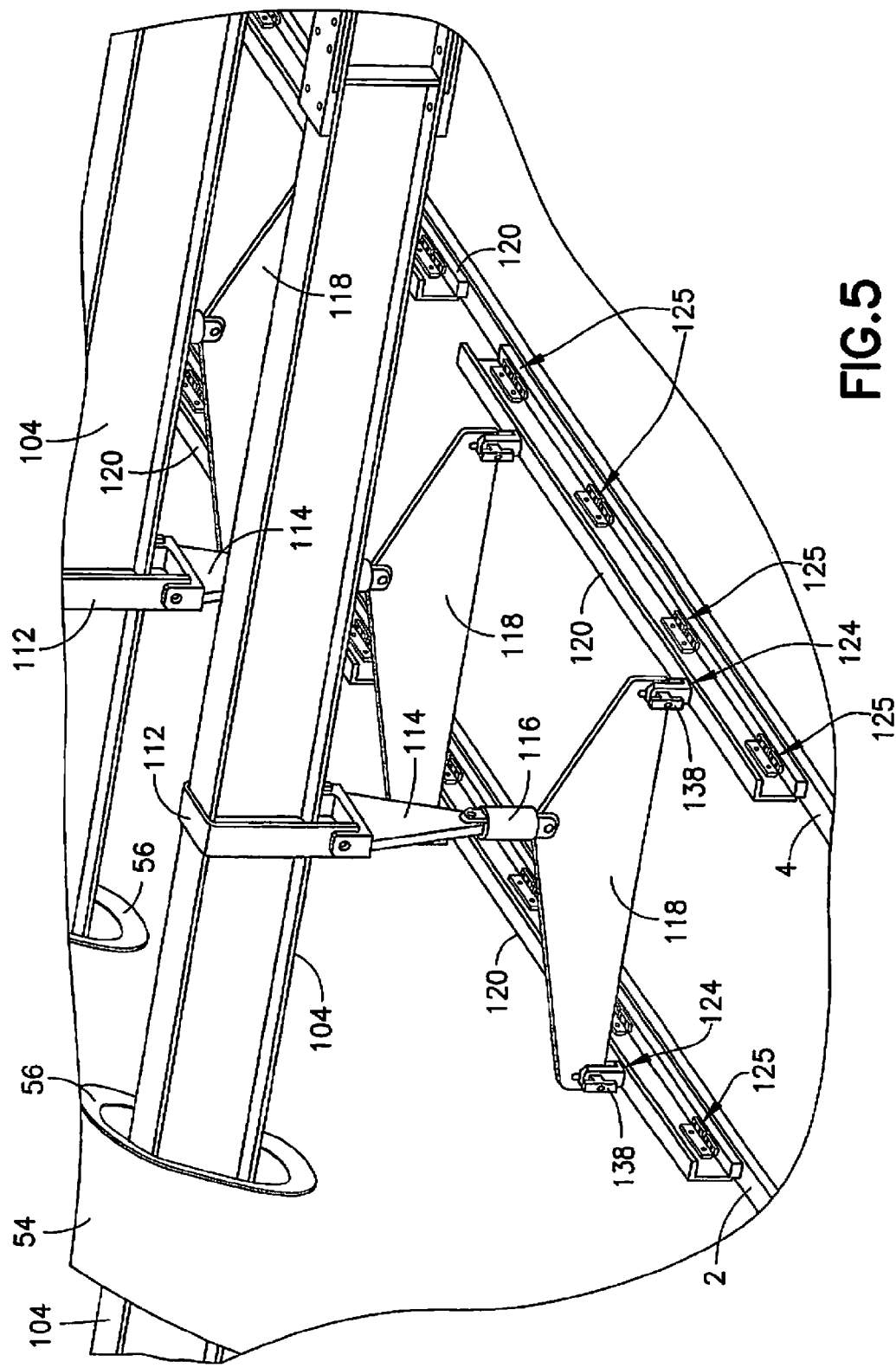

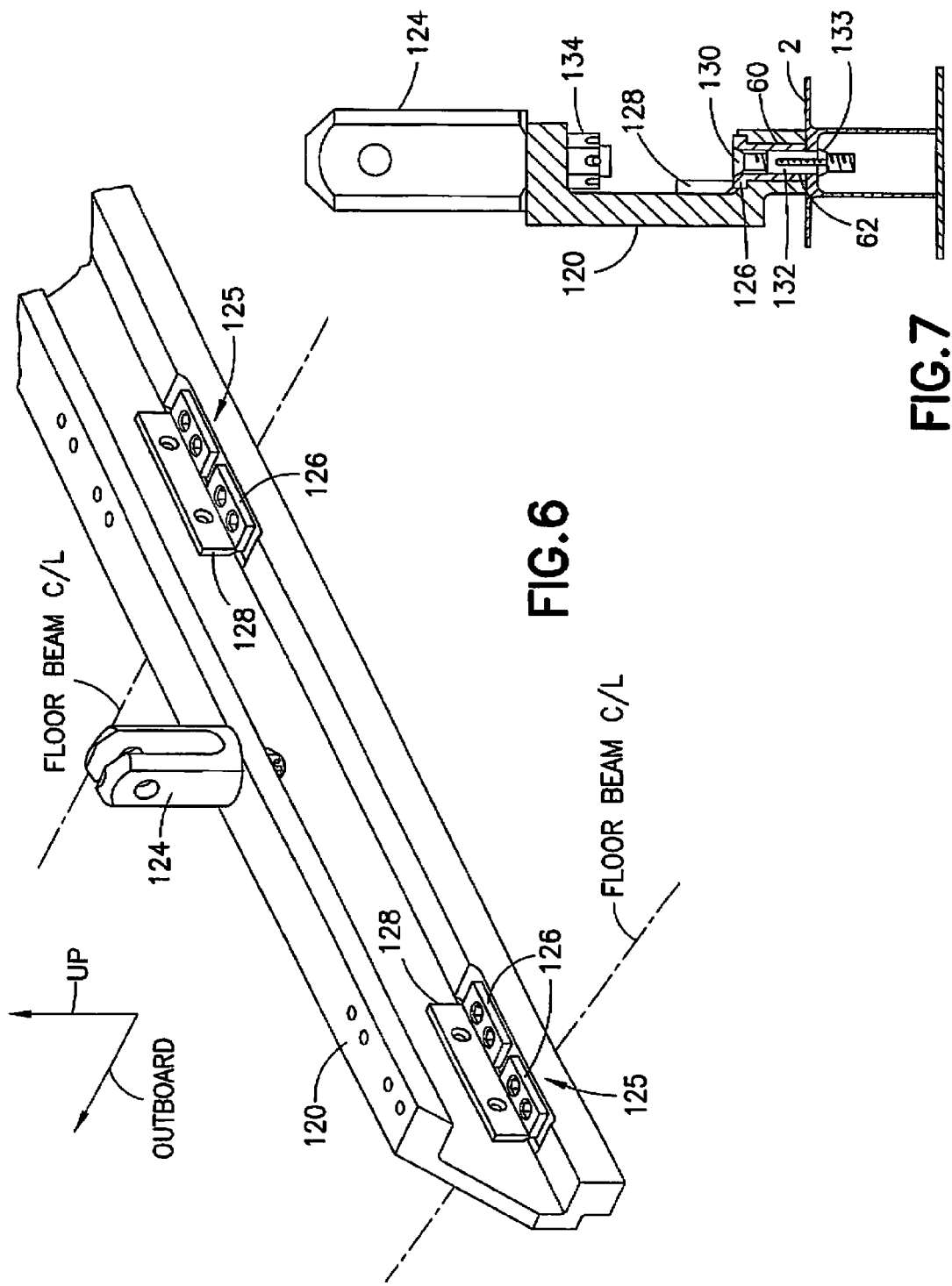

METHOD AND APPARATUS FOR SUPPORTING AN AIRCRAFT STRUCTURE DURING REPAIR

BACKGROUND

This disclosure generally relates to systems and methods for supporting an airplane in order to facilitate the repair or replacement of airplane parts.

Many existing shoring practices for repairing and/or replacing parts of an airplane require that support equipment such as body cradles be disposed against various portions of the airplane, and additionally require the use of support equipment comprising horizontal stabilizing units. This support equipment is used to support the airplane via the airplane's airframe structure in order keep the airplane off of the ground to facilitate maintenance tasks. In these existing shoring practices, the rigidity of the airplane is primarily dependent upon the airframe structure. For this reason, there is a limit to the amount of airframe structure that can be removed simultaneously. Exceeding these limits will result in deformation and overload of the airframe, which will render the airplane un-airworthy. Often, due to airplane constraints and/or loading limits, additional load bearing supports at other locations are not allowed. When lower fuselage skin panels are replaced, stabilizing beams are often extended through the airplane's windows to allow the cradles to be removed in order to gain access to the lower skin panels.

An apparatus and/or method for supporting an airplane should maintain the rigidity required to avoid overloading the remaining airframe structure, the required airframe alignment, and the structural integrity, strength, and airworthiness requirements. Typical jacking and shoring solutions include: 1) jacking from structural jack points manufactured on the airplane; 2) using contoured body cradles contacting and lifting on the lower portion of the fuselage; 3) installing window beams that interface with the structural window forgings that are common to most aircraft. Another solution is to support the airplane alignment via the airplane's floor structure. In particular, U.S. Pat. No. 8,393,598 discloses a shoring apparatus (described in more detail below with reference to FIGS. 1 and 2) comprising a plurality of beams disposed underneath an airplane floor structure within the airplane, and one or more jacks supporting the beams.

Generally, if the airplane has sustained damage on the lower portion of the fuselage, the repair personnel must jack and support the airplane at an elevation above the location of the damage to be repaired. Traditional aircraft having fuselages not made of composite material have heavy, structural window forgings that surround each window interior. Each window forging is configured to mate with the airframe of the aircraft. It is known to pass a structural I-beam through the window and use a special nest block to transmit load to the window forging and support the aircraft there. The drawbacks of this technique are the fuselage skins then take the load, but for the most part, this method is sufficient. However, an airplane having a fuselage made of composite material (e.g., carbon fiber reinforced plastic) has no such window forging, and does not have the structural integrity to carry any type of jacking load through the skin from this location.

There is a continuing demand for improvements in systems and methods for supporting an airplane.

SUMMARY

The subject matter disclosed in detail below is directed to support systems and methods that allow technicians to jack and support a damaged aircraft by the seat tracks. The seat tracks are structurally joined to the floor beam grid structure which extends throughout the aircraft. In accordance with the methods disclosed herein, portions or all of the aircraft weight can be supported by means of beams that are coupled to seat tracks rather than in contact with window forgings. The loads supported by the individual seat tracks can be controlled by the use of load distribution plates. These plates enable technicians to mechanically induce specific loads, and percentages of those loads into different seat tracks throughout the aircraft. This allows precise control of the loads being transferred into the aircraft structure. The modular nature of this method facilitates the handling of any major structural repair to the lower portion of the aircraft. The equipment is designed to be used with readily available aircraft jacks and jacking systems. This tool and method will further enable the repair of heavily damaged aircraft at remote site locations around the world.

The systems and methods disclosed in detail below allow technicians at a remote site (or any repair/modification center) to jack an aircraft structure using beams coupled to seat tracks attached to a floor beam grid structure so that the loads induced into the aircraft structure can be carefully controlled. The disclosed support system utilizes commercially available aircraft jacks that contain load cells for monitoring the loads applied. The beams can be coupled to the seat tracks via load distribution plates. These load distribution plates can have offset lift pin location to allow a certain percentage of the load to be applied to specific seat tracks within the aircraft. Because specific tracks can only carry certain loads, the technicians need to control how the loads are induced in order to straighten and support the aircraft. Different quantities of seat tracks can be utilized per requirements. Attachment rails that interface with the seat tracks use the same hardware that is used to fasten aircraft seats to the seat tracks. This helps handle the load and prevent damage to the seat tracks. The jacking apparatus also includes load swivels and a hanger link to prevent any side or twisting loads from being applied. This is advantageous when jacking to the floor while the floor is not perfectly level or when the jacks are not lifting equally.

One aspect of the subject matter disclosed herein is a method for supporting an aircraft structure comprising: (a) placing a beam so that one end protrudes out a first window opening on one side of a fuselage, another end protrudes out a second window opening on another side of the fuselage, and a portion of the beam inside the fuselage overlies a floor that is attached to the fuselage; (b) mechanically coupling the beam to seat tracks on the floor; and (c) raising the beam until at least a portion of the weight of the aircraft structure is supported by the beam via the mechanical coupling of the beam to the seat tracks. The beam is raised by jacking a pair of support posts which support the opposing ends of the beam. Steps (a) through (c) may be performed for each one of a multiplicity of beams. In accordance with one implementation, step (b) comprises: coupling a load distribution plate to the beam; coupling first and second rails to first and second seat tracks respectively; and coupling the load distribution plate to the first and second rails. In that same implementation, step (a) comprises: placing a first beam segment so that one end protrudes out the first window opening on the one side of the fuselage and another end overlies the floor; placing a second beam segment so that one end protrudes out the second window opening on the other side of the fuselage and another end overlies the floor; and splicing the ends of the first and second beam segments that overlie the floor to each other.

Another aspect is an apparatus for supporting an aircraft structure comprising: a first beam having opposing ends; first and second support posts that support the opposing ends of the first beam; first and second jacks that respectively support the first and second support posts; a first load distribution plate coupled to the first beam; and first and second rails coupled to the first load distribution plate. In accordance with one embodiment, the apparatus may further comprise: a second beam having opposing ends; third and fourth support posts that support the opposing ends of the second beam; third and fourth jacks that respectively support the third and fourth support posts; and a second load distribution plate coupled to the second beam and to the first and second rails. In accordance with one embodiment, the apparatus may further comprise: a second beam having opposing ends; a first load transfer beam that supports one opposing end of the first beam and one opposing end of the second beam, and is supported by the first support post; a second load transfer beam that supports the other opposing end of the first beam and the other opposing end of the second beam, and is supported by the second support post; and a second load distribution plate coupled to the second beam, and coupled to the first and second rails. Each load distribution plate may be coupled to a respective beam by means of a saddle, a hanger link coupled to the saddle, and a swivel coupled to the hanger link and to the load distribution plate. Furthermore, each beam comprises first and second beam segments and first and second splice plates attached to and connecting the first and second beam segments.

A further aspect of the disclosed subject matter is a system comprising an aircraft structure and a support apparatus, wherein the aircraft structure comprises a fuselage having respective multiplicities of window openings on opposite sides thereof, a frame attached to the fuselage, and first and second seat tracks attached to the floor, and wherein the support apparatus comprises: a first beam arranged so that one end protrudes out a first window opening on one side of the fuselage, another end protrudes out a second window opening on another side of the fuselage, and a portion of the beam inside the fuselage overlies the floor; first and second support posts that support the ends of the first beam; first and second jacks that respectively support the first and second support posts; and first and second rails coupled to the first beam, the first rail being coupled to the first seat track and the second rail being coupled to the second seat track. In accordance with one implementation, the first and second rails are coupled to the first beam by a tool assembly comprising a first load distribution plate that is coupled to the first and second rails, a saddle in contact with the first beam, a hanger link coupled to the saddle, and a swivel coupled to the hanger link and to the first load distribution plate.

Yet another aspect is a method for lifting an aircraft structure comprising: (a) supporting a plurality of beams on a plurality of support posts; (b) mechanically coupling the plurality of beams to a plurality of seat tracks attached to a floor of the aircraft structure; and (c) jacking the plurality of support posts until the plurality of beams exert forces on the plurality of seat tracks sufficient to lift the aircraft structure. In accordance with one embodiment, the aircraft structure comprises a fuselage to which the floor is attached. The fuselage has a first plurality of window openings on one side and a second plurality of windows on the other side. Each beam of the plurality of beams passes through and protrudes from a respective window opening of the first plurality of window openings and a respective window opening of the second plurality of window openings. The support posts are disposed outside the fuselage.

Other aspects of systems and methods for supporting an aircraft structure are disclosed below.

BRIEF DESCRIPTION OF THE DRAWINGS

FIG. 5 is a diagram representing an isometric view of portions of a support system comprising rail assemblies attached to respective seat tracks on a floor inside a fuselage.

FIG. 6 is a diagram representing an isometric view of portions of a rail assembly of the type incorporated in the support apparatus depicted in FIGS. 2 and 4.

FIG. 7 is a diagram representing a sectional view of a rail assembly attached to a seat track.

Reference will hereinafter be made to the drawings in which similar elements in different drawings bear the same reference numerals.

DETAILED DESCRIPTION

The following detailed description discloses the currently contemplated modes of implementing a system and methodology for lifting and/or supporting an aircraft structure. The description is not to be taken in a limiting sense, but is made merely for the purpose of illustrating the general principles of the teachings disclosed herein, since the broad scope of this disclosure is best defined by the claims.

It is known to provide apparatus and/or methods for shoring an airplane to facilitate the replacement of one or more airplane parts. Known apparatus and/or methods allow structural components to be removed/replaced simultaneously while maintaining airframe integrity and airworthiness requirements. This may be accomplished by supporting the airplane alignment via the airplane's floor structure. Such apparatus and/or methods are designed to maintain the rigidity and alignment of the airframe to avoid overloading the remaining airframe structure and to satisfy structural integrity, strength, and airworthiness requirements.

Figure 1:
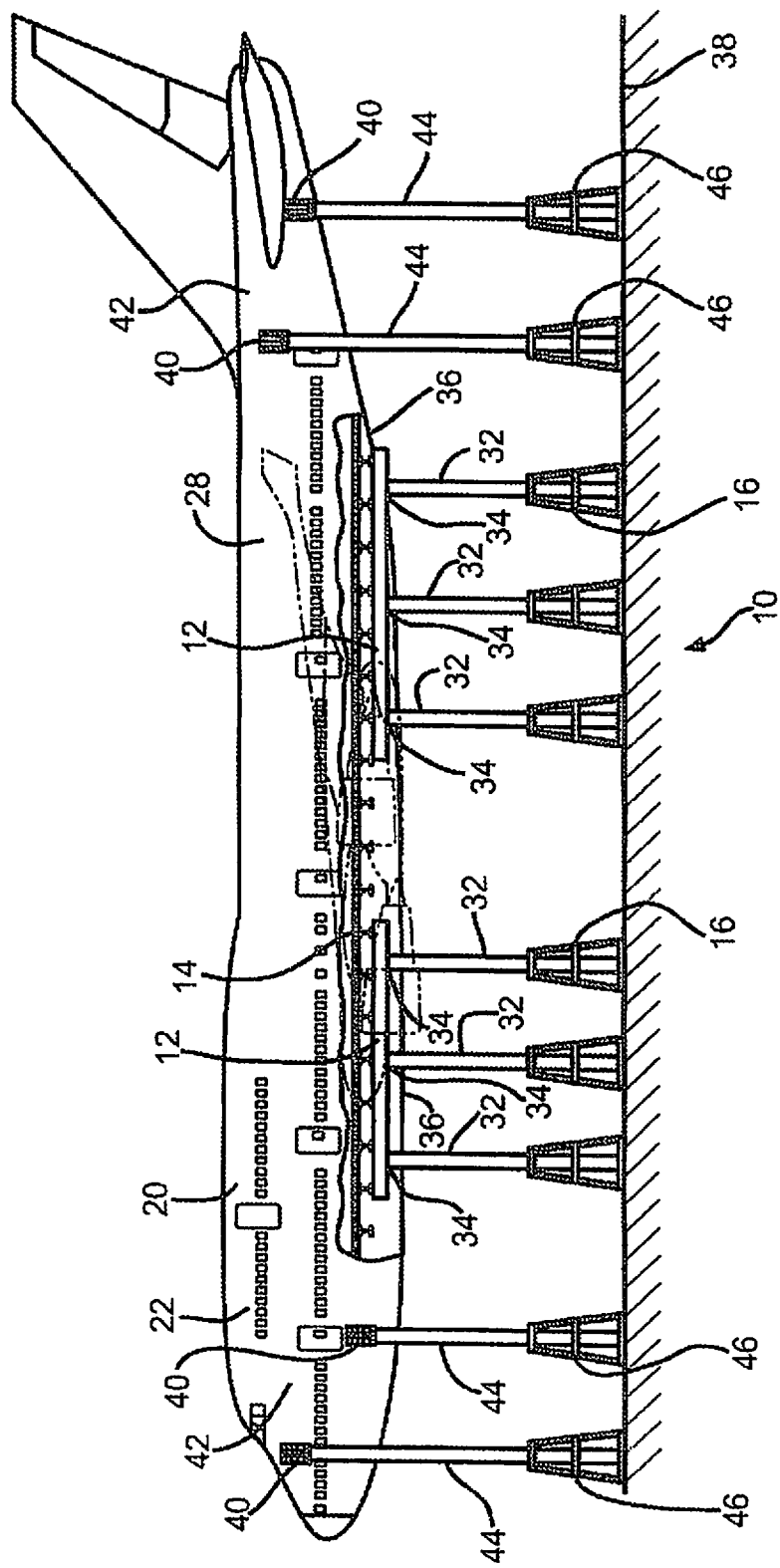
FIG. 1 is a diagram representing a side, partial cut-away view of an airplane supported by a known shoring apparatus.

FIG. 1 (taken from U.S. Pat. No. 8,393,598) shows an apparatus for shoring an airplane. The apparatus comprises a plurality of beams 12 disposed underneath an airplane floor structure 14 within the airplane 22, and one or more jacks 16 supporting the beams 12 by way of respective support posts 32. The beams 12 may be made of one or more various materials such as aluminum and steel, and may be abutted and/or attached to the bottom of the airplane floor structure 14. The jacks 16 are supported by a ground surface 38 and at least some of the support posts 32 extend through respective holes 34 in the airplane's lower skin 36 all the way to the beams 12 disposed within the airplane 22. The jacks 16 may be used to extend the support posts 32 upwardly in order to support the airplane 22 during the replacement of one or more airplane parts, and/or to raise the airplane 22 off the ground during a replacement procedure. Load cells may be used to distribute weight appropriately throughout the jacks 16 and/or beams 12. In one embodiment, two separate jacks 16 and support posts 32 may be utilized on pairs of beams 12 respectively disposed in a forward portion 20 and an aft portion 28 of the aircraft 22. The apparatus may further include one or more body fittings 40 attached to an outer surface 42 of the airplane 22 to aid in shoring up the airplane during the replacement procedure. The body fittings 40 are attached to the airplane 22 through the use of bolts or other mechanisms known in the art. Support posts 44 may extend from jacks 46 on the ground surface 38 to the body fittings 40 attached to the airplane 22.

In contrast to the known shoring apparatus depicted in FIG. 1, the support systems disclosed in detail hereinafter do not require that holes be made in the fuselage for insertion of horizontal support beams underneath the floor beams. In the support systems disclosed hereinafter, each horizontal support beam is passed through a pair of window openings on opposite sides of a fuselage after the windows have been removed. Each beam is disposed at an elevation above the floor and can be configured to support the floor by coupling the window beam to two or more seat tracks attached to the floor. As used herein, the term "beam" encompasses monolithic beams as well as beam segments spliced together.

Figure 2:
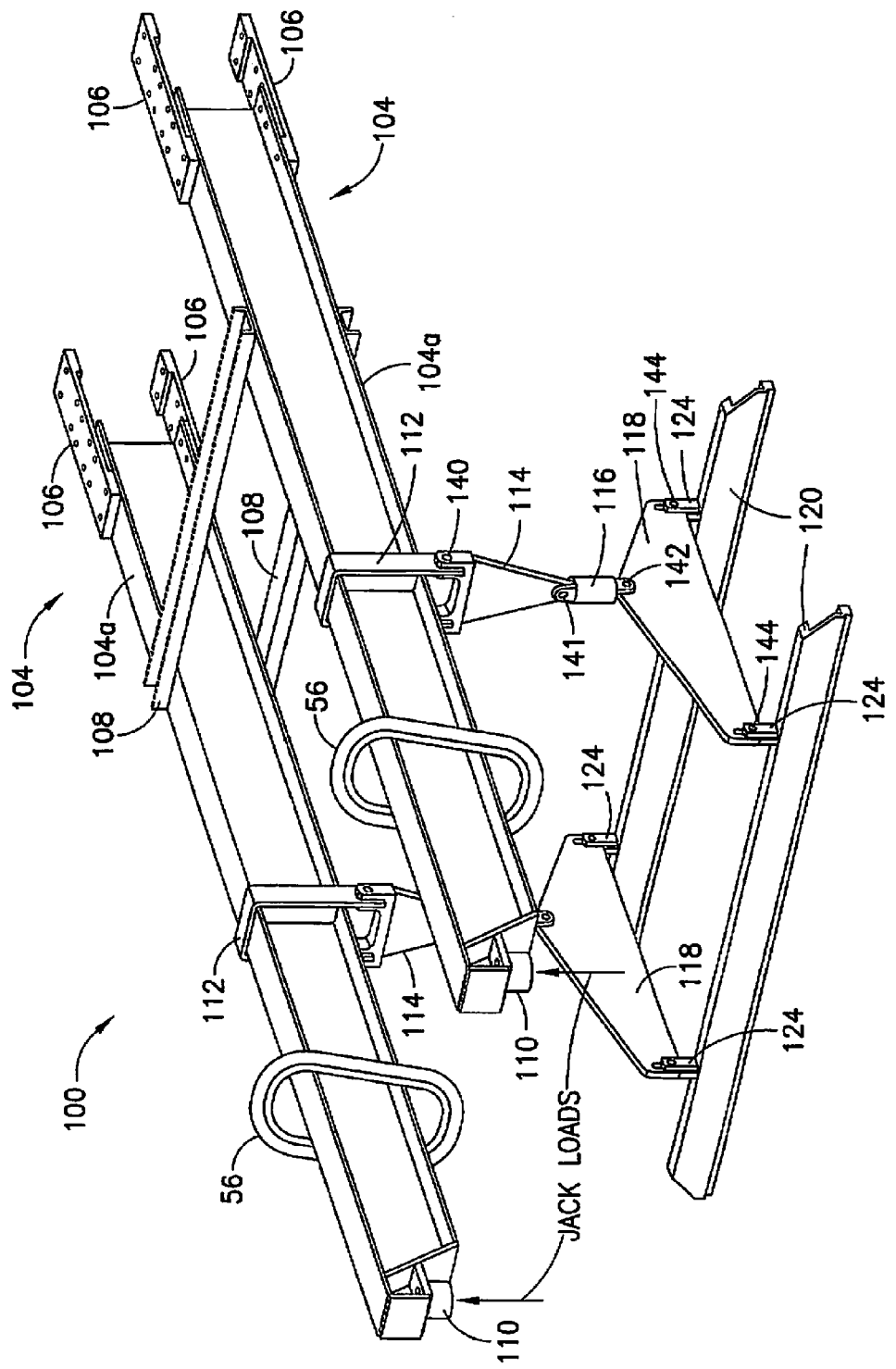
FIG. 2 is a diagram representing an isometric view of portions of a support apparatus in accordance with one embodiment in which each beam end is supported by a respective jack (i.e., one jack per beam end).

FIG. 2 shows portions of a support apparatus 100 that comprises a plurality of beams 104 in accordance with one embodiment. Each beam 104 comprises a first beam segment 104a, a second beam segment (not shown in FIG. 2, but see beam segment 104b in FIG. 3)), and a pair of splice plates 106 which connect the beam segments. Lateral braces 108 connect the respective beam segments 104a shown in FIG. 1. The beam segments not shown in FIG. 1 can be similarly braced using lateral braces. The lateral braces 108 can be attached using C-clamps (not shown).

As seen in FIG. 2, respective portions of the beam segments 104a pass through and protrude from respective window openings defined by respective window frames 56 attached to a fuselage (not shown). Respective ends of the beam segments not shown in FIG. 2 also pass through respective window frames (not shown) on the other side of the fuselage. The end of each beam segment 104a has a respective adaptor 110 which is removable. These adaptors 110 are designed to engage the tops of respective support posts (not shown in FIG. 2) of the type depicted in FIG. 1 (see support posts 32 in FIG. 1). Likewise the ends of the beam segments not shown in FIG. 2 have adaptors designed to engage the tops of respective support posts. Thus each beam 104 can be supported in a generally horizontal position by a pair of support posts placed outside the fuselage and underneath respective adaptors 110 at opposite ends of the beam. A respective jack load will be applied to each adapter 110, as indicated by arrows in FIG. 2. Thus the opposing ends of the beams 104 can are raised by jacking.

The support apparatus 100 shown in FIG. 2 further comprises tool assemblies for coupling each of two beams 104 to a pair of rails 120. As will be described in more detail below with reference to FIGS. 5-7, the rails 120 are designed to be fastened to seat tracks attached to a floor inside a fuselage.

In the example shown in FIG. 2, the rails 120 are suspended from beams 104 by means of respective tool assemblies. Each tool assembly comprises a saddle 112 seated on a beam 104, a hanger link 114 pivotably coupled to the saddle 112 by a pair of clevis pins 140 (only one clevis pin 140 is visible in FIG. 2), a double-clevis swivel 116 pivotally coupled to the hanger link 114 by a clevis pin 141, a load distribution plate 118 pivotally coupled to the double-clevis swivel 116 by a clevis pin 142 and pivotally coupled to respective single-clevis swivels 124 by means of respective clevis pins 144. The single-clevis swivels 124 are respectively loosely coupled to rails 120. As best seen in FIG. 7, each single-clevis swivel 124 is coupled to rail 120 by means of a respective castellated nut 134, which allows the single-clevis swivel 124 to swivel about its vertical axis.

Figure 3:
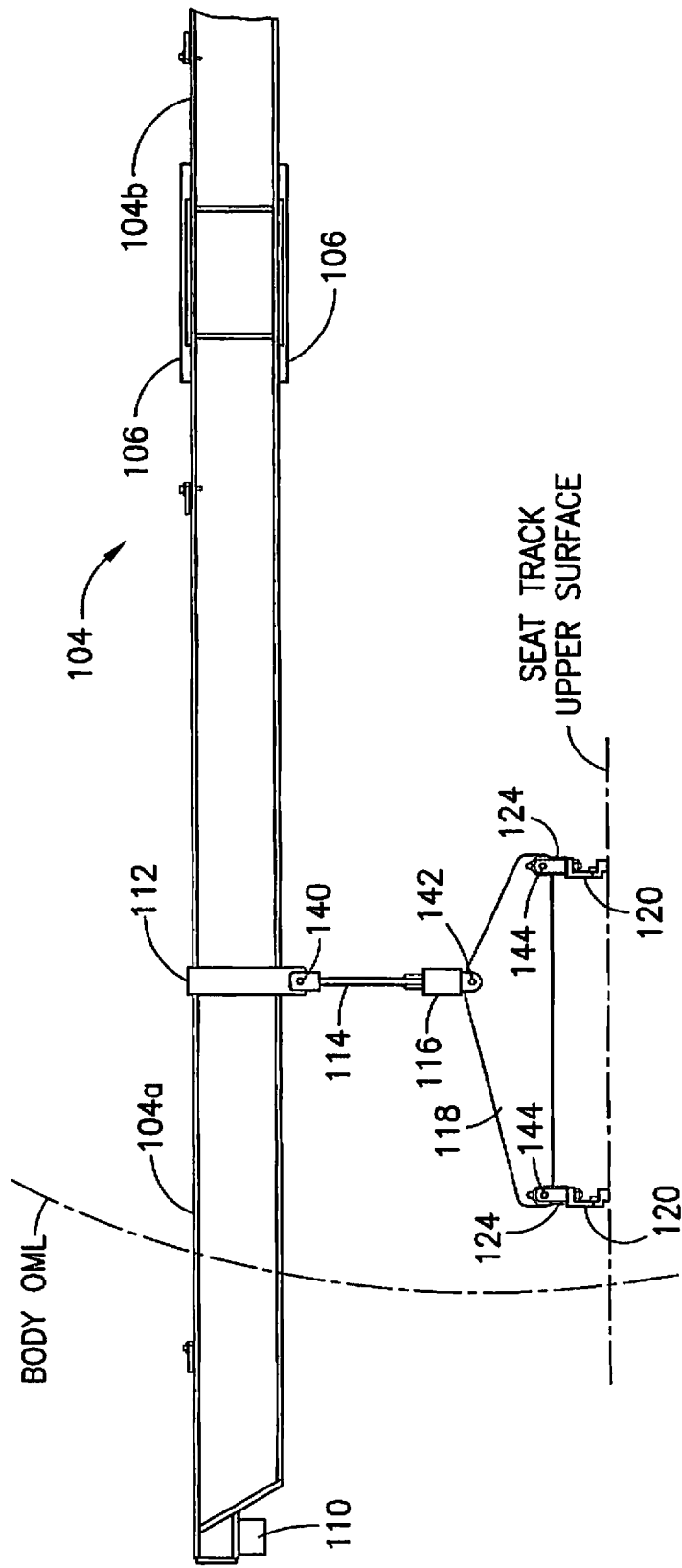
FIG. 3 is a diagram representing an elevational view of portions of a beam assembly of the type incorporated in the support apparatus depicted in FIG. 2.

FIG. 3 shows an elevational view of portions of a beam assembly of the type incorporated in the support apparatus depicted in FIG. 2. The beam 104, comprising beam segments 104a and 104b spliced together by splice plates 106, is disposed generally horizontally. A tool assembly comprising a saddle 112, a hanger link 114, a double-clevis swivel 116, and a load distribution plate 118 couples the beam 104 to a pair of rails 120. The curved dashed line indicates the outer mold line (OML) of a fuselage; the straight dashed line indicates a plane that is coplanar with the seat track upper surfaces. The portion of beam 104 that has the adaptor 110 attached thereto is disposed outside the fuselage. The splice plates 106 are disposed inside the fuselage. During set-up of the beam assembly, each beam segment 104a, 104b is brought into the interior of the aircraft and set on saw horses; then the distal ends of beam segments 104a, 104b are moved outboard through respective window openings on opposite sides of the fuselage. When the proximal ends of beam segments 104a, 104b have a specified spacing, the beam segments 104a, 104b are spliced by fastening the splice plates 106 to the proximal ends thereof. Alternatively, monolithic beams (rather than segmented beams) could be installed using a crane located outside the aircraft.

Figure 4:
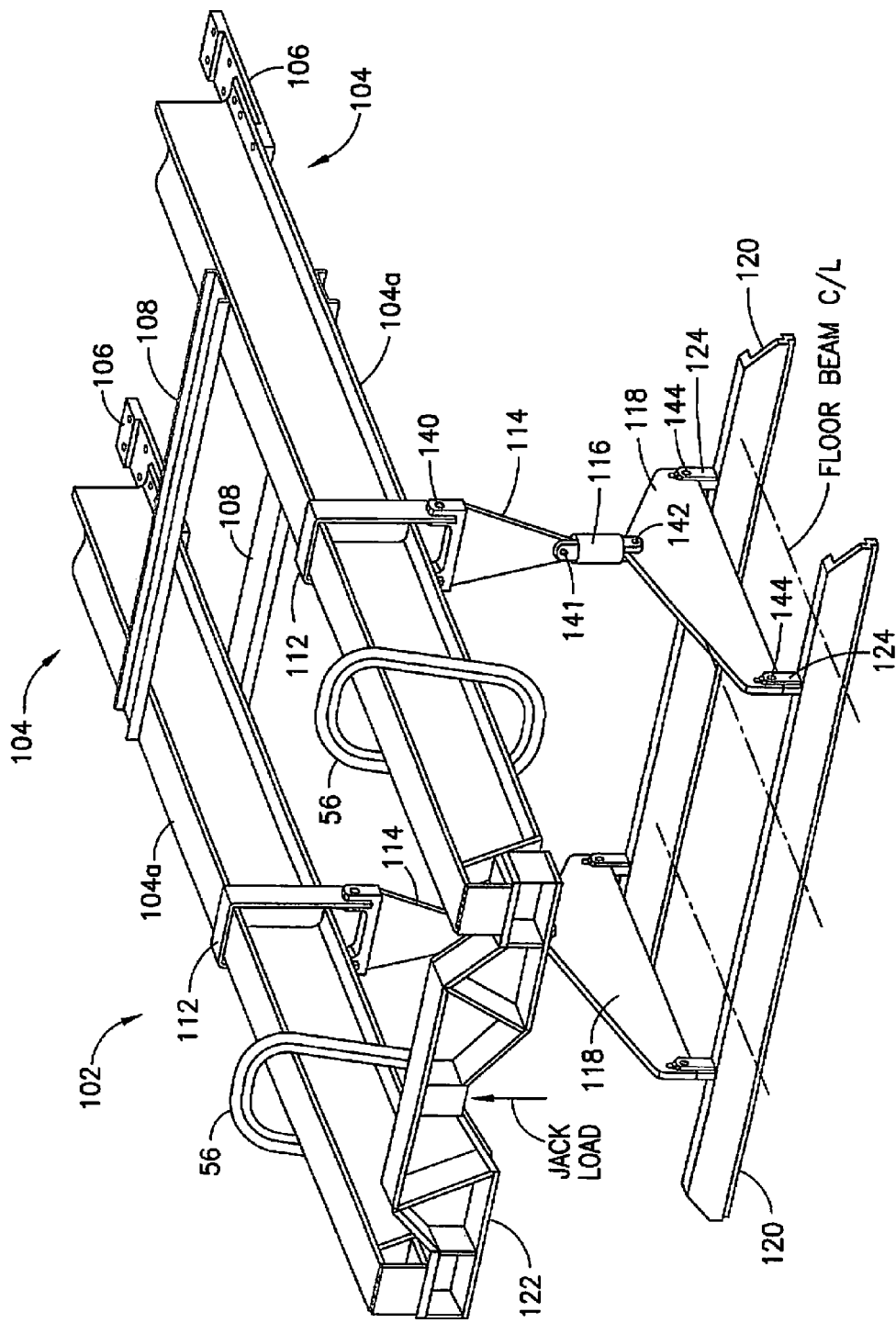
FIG. 4 is a diagram representing an isometric view of portions of a support apparatus in accordance with another embodiment in which each pair of beam ends is connected by a respective load transfer beam, and each load transfer beam is supported by a respective jack (i.e., one jack per load transfer beam).

FIG. 4 shows portions of a support apparatus 102 in accordance with another embodiment in which each pair of beam ends is connected by a respective load transfer beam 122, and each load transfer beam 122 is supported by a respective support post (not shown) at the location indicated by the arrow labeled "JACK LOAD" in FIG. 4. The ends of the load transfer beam 122 are respectively fastened to the abutting ends of the beams 104 after the adaptors (see adaptors 110 in FIG. 2) have been removed from the beam ends. The tool assemblies for coupling two beams 104 to two rails 120 may have the same structure as previously described with reference to FIG. 2, which description will not be repeated here. The dashed lines in FIG. 4 indicate respective floor beam centerlines. The rails 120 will be fastened to respective seat tracks (not shown in FIG. 4), which seat tracks are fastened to transverse floor beams (not shown).

In the preferred embodiments, load distribution plates are used because when loads are applied, the beams deflect and sag in the center, thus making it difficult to control the magnitude of any given load application. The load distribution plates apply the loads evenly and manage the problem. Optionally, the load distribution plates 118 could be eliminated if a specific repair scenario made this practical. In such a case, each tool assembly would be coupled to one rail as opposed to two or more rails. For example, a tool assembly may comprise a saddle, a hanger link coupled to the saddle, a double-clevis swivel coupled to the hanger link, and a connecting plate coupled to the double-clevis swivel and to a single rail.

FIG. 5 shows portions of a support system comprising rails 120 which are fastened to respective seat tracks 2 and 4 on a floor 10 inside a fuselage 54. The fuselage 54 may be made of composite material. As previously described, each beam 104 extends through window openings formed by respective window frames 56 on opposing sides of the fuselage 54. Only one side of the fuselage 54 is shown in FIG. 5. In the example shown in FIG. 5, four rails 120 are visible but only two beams 104 are visible. The beams 104 visible in FIG. 5 are coupled to the forward pair of rails 120 via respective tool assemblies of the type previously described with reference to FIG. 2. Two additional beams (not shown in FIG. 5) are coupled to the aft pair of rails 120 which are only partly visible in FIG. 5.

In the specific implementation depicted in FIG. 5, each rail assembly comprises a respective rail 120, a pair of single-clevis swivels 124 attached to the rail 120, and plural sets (e.g., four) of attachment hardware 125 which assist in attaching rails 120 to seat tracks 2 and 4. One lower corner of the first load distribution plate 118 is pivotably coupled to a single-clevis swivel 124 coupled to a rail 120 that is attached to seat track 2, while the other lower corner of the first load distribution plate 118 is pivotably coupled to a single-clevis swivel 124 that is coupled to a rail 120 attached to seat track 4. The lower corners of each load distribution plate 118 may be pivotably coupled to respective single-clevis swivels 124 by means of respective ball lock pins 138.

FIG. 6 shows portions of one rail assembly in more detail. Each set of attachment hardware 125 comprises a pair of captive inserts 126 held loosely in place by a retainer strip 128, which is fastened to rail 120. The retainer strip 128 allows the captive inserts 126 to float and align with corresponding holes in the seat track (not shown in FIG. 6, but see hole 62 in seat track 2 in FIG. 7). Each captive insert 126 has two holes.

FIG. 7 is a sectional view of a rail assembly attached to a seat track 2. The plane of the cross section is transverse to the longitudinal axis of the rail 120. As seen in FIG. 7, the rail 120 sits on top of the seat track 2. Each captive insert 126 is inserted in a respective opening 60 formed in rail 120. Each hole in each captive insert 126 receives a fastener comprising a captive screw 130 and an expandable collet 132. The collet 132 is inserted first; then the captive screw 130 is screwed into the collet 132. When fully inserted (as shown in FIG. 7), the collet 132 extends into a hole 62 formed in the seat track 2. The expandable collet 132 contracts as a lip 133 passes through the hole 62 in the seat track 2. When the lip 133 passes through hole 62, the collet 132 expands and the lip 133 grabs the seat track 2 as shown in FIG. 7. When a screw 130 is screwed into the collet 132, the collet 132 is locked in its expanded state. In the implementation shown in FIG. 5, the rail 120 in the forefront (i.e., the rail 120 which is visible without obstruction) is fastened to seat track 4 by means of sixteen fasteners of the type shown in FIG. 7. However, the number of fasteners is dependent on the length of the rail.

Figure 8:
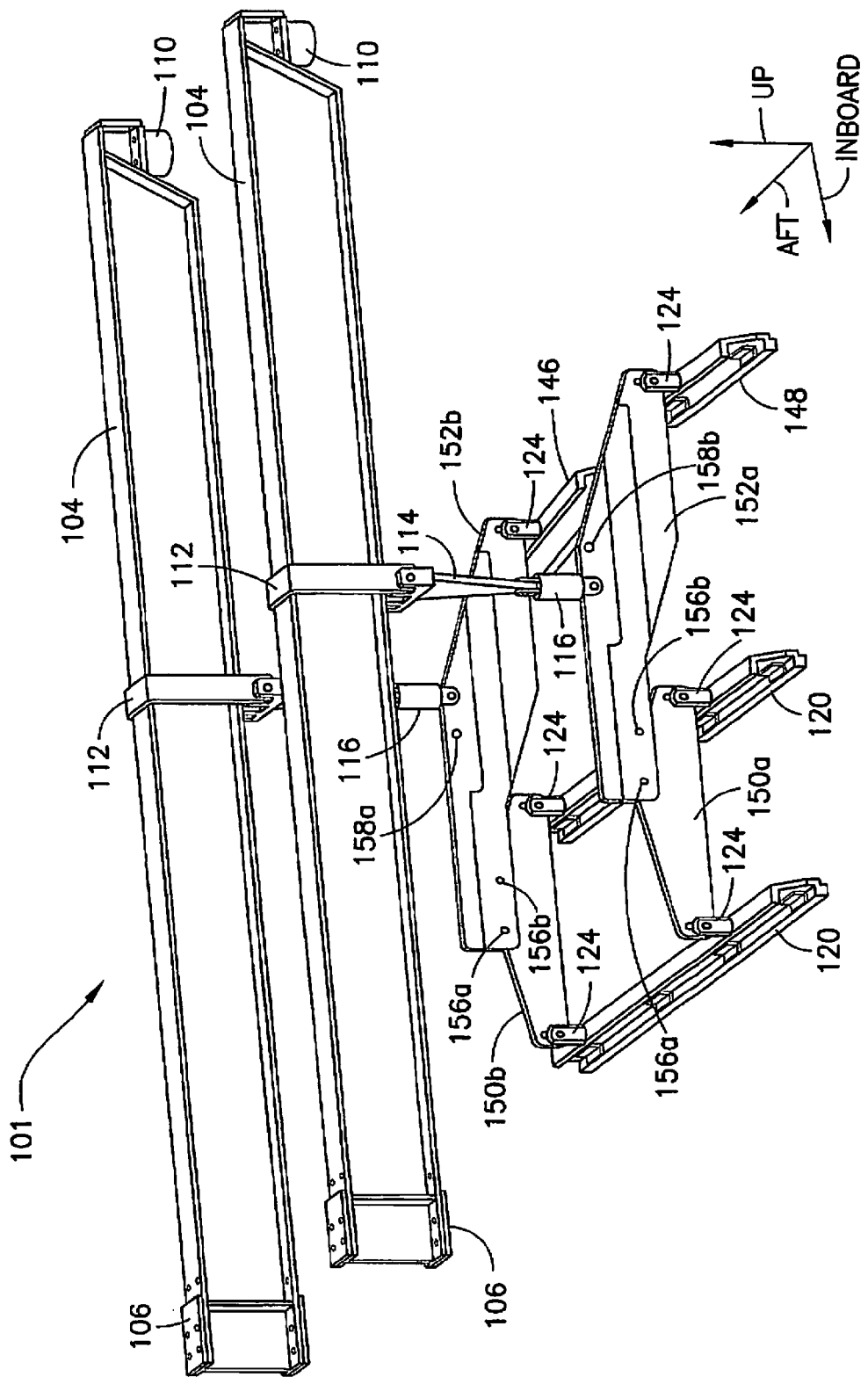
FIG. 8 is a diagram representing an isometric view of portions of a support apparatus in accordance with an alternative embodiment in which each separate load applied to a beam by a respective tool assembly is distributed among three seat tracks.

FIG. 8 is an isometric view of portions of a support apparatus 101 in accordance with an alternative embodiment in which each separate load applied to a beam by a respective tool assembly is distributed among more than two tracks. The seat tracks to which support apparatus 101 is attached are not shown in FIG. 8, but their respective locations can be inferred from the locations of two long rails 120 and two short rails 146 and 148. The two rails 120 are mutually parallel; the short rail 148 is parallel to rails 120; and the short rail 146 is angled because it is attached to a canted seat track (not shown).

In accordance with the embodiment shown in FIG. 8, each load applied to a beam 104 by a saddle 112 is distributed to more than two seat tracks by means of two load distribution plates which are pivotably coupled to the rails and to each other. Each of load distribution plates 150a and 150b is coupled to the pair of rails 120 by means of respective single-clevis swivels 124, as previously described. However, unlike the load distribution plates previously described, load distribution plates 150a and 150b are not coupled to the double-clevis swivels 116, but instead they are coupled to the load distribution plates 152a and 152b respectively.

Load distribution plate 152a is coupled to the rail 148 by means of a single-clevis swivel 124 and is coupled to the load distribution plate 150a by means of a pin inserted in a hole 156a formed in load distribution plate 152a, which hole 156a overlaps a hole (not visible in FIG. 8) formed in load distribution plate 150a. Similarly, load distribution plate 152b is coupled to the rail 146 by means of a single-clevis swivel 124 and is coupled to the load distribution plate 150b by means of a pin inserted in a hole 156b formed in load distribution plate 152b, which hole 156b overlaps a hole (not visible in FIG. 8) formed in load distribution plate 150b. Each load distribution plate 152a, 152b is coupled to a respective double-clevis swivel 116 for applying the distributed loads to a respective beam 104.

It should be appreciated that each load distribution plate 152a, 152b has two sets of spaced holes which allow the lateral position of each load distribution plate 152a, 152b relative to the respective load distribution plate 150a, 150b to be adjusted. For the sake of illustration, FIG. 8 shows a first pair of holes 156a and 156b having a specified spacing and a second pair of holes 158a and 158b having the same spacing. However, the number of spaced holes in each set may be greater than two. Although the hole in load distribution plate 152a corresponding to hole 158a in load distribution plate 152b is not visible in FIG. 8, it should be appreciated each of load distribution plate 152a, 152b has the same set of holes.

In the implementation In the situation shown in FIG. 8, the lift pin that pivotably couples load distribution plates 150a and 152a is inserted in hole 156a of load distribution plate 152a and an aligned hole (not visible) in load distribution plate 150a, whereas the lift pin that pivotably couples load distribution plates 150b and 152b is inserted in hole 156b of load distribution plate 152b and an aligned hole (not visible) in load distribution plate 150b. Thus the total length of coupled load distribution plates 150a and 152a is greater than the total length of coupled load distribution plates 150b and 152b by an amount equal to the specified spacing between holes 156a and 156b. This feature allows the length of the coupled load distribution plates to be adjusted as a function of the distance between the rails which are furthest apart in a particular load distribution scheme.

In addition, the load distribution plates 150a, 150b, 152a, 152b can be configured to control the loads supported by the individual seat tracks. The offset lift pin location allows a certain percentage of the load to be applied to specific seat tracks within the aircraft. Because specific tracks can only carry certain loads, the technicians need to control how the loads are induced in order to straighten and support the aircraft. Different quantities of seat tracks can be utilized per requirements.

Each of the support apparatus shown in FIGS. 2, 4 and 8 can be duplicated multiple times to provide sufficient load-carrying capacity for supporting an aircraft structure. Each beam or each pair of beams supported by a pair of load transfer beams can be supported by commercially available support posts and jacks.

Figure 9:
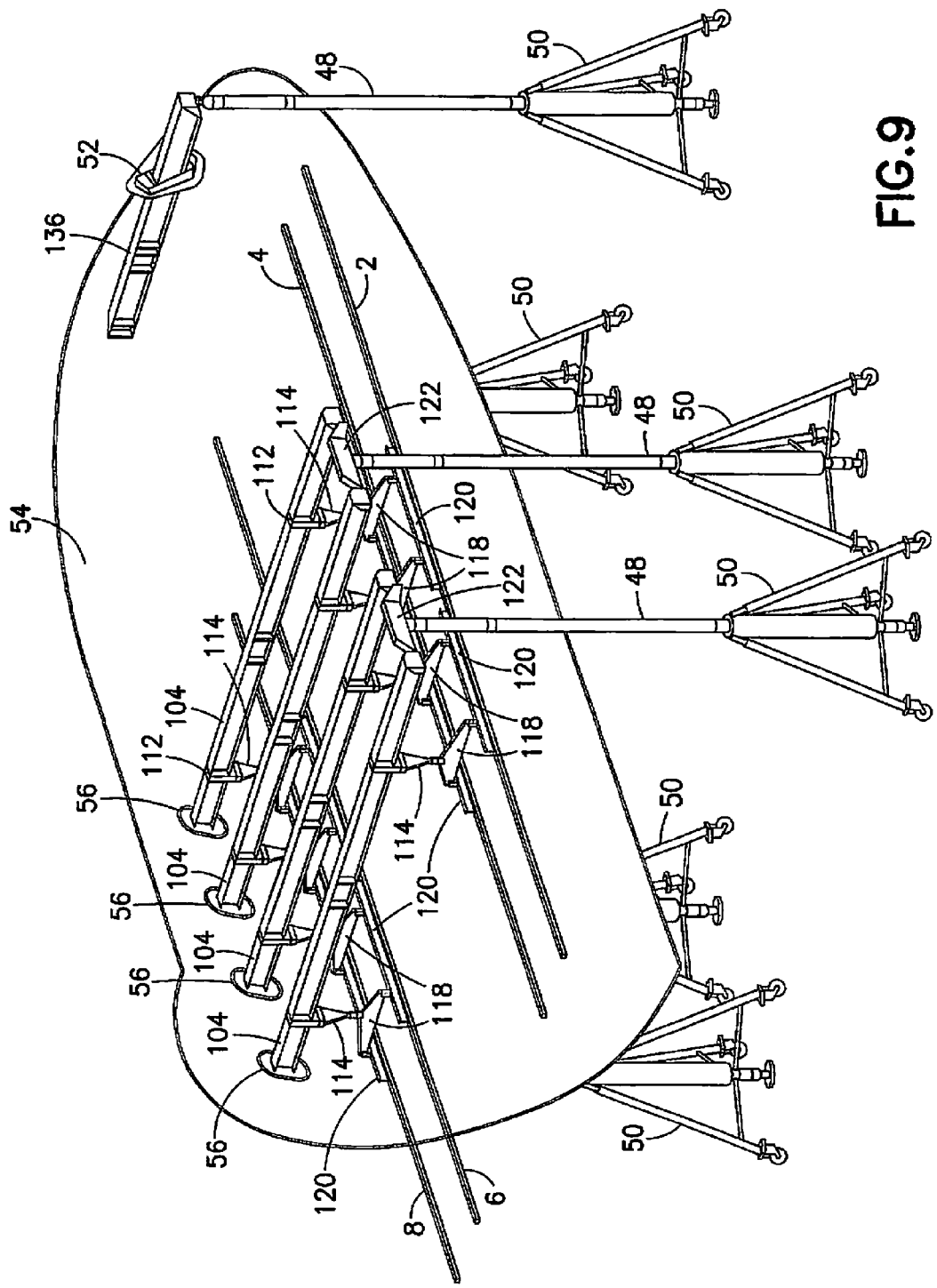
FIG. 9 is a diagram showing the general layout of a system comprising a cockpit window beam and a multiplicity of window beams for supporting an aircraft structure, each end of two window beams being supported by a respective load transfer beam for transferring the loads from the two beam ends to one jack.
Figure 10:
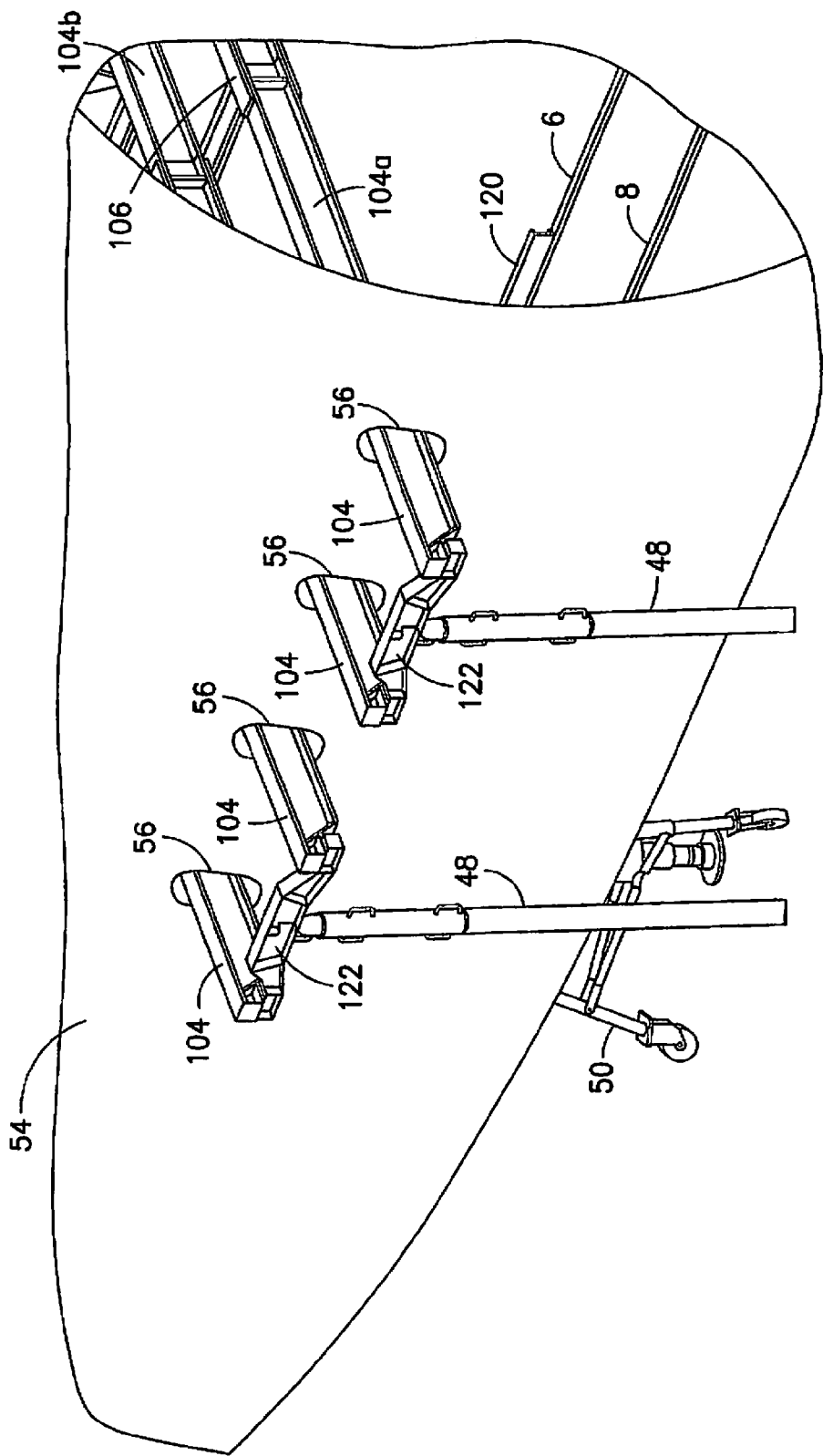
FIG. 10 is a diagram showing an external view of a portion of an aircraft structure being supported by the support apparatus depicted in FIG. 9.

FIG. 9 shows the general layout of a system for supporting an aircraft structure utilizing a plurality of window beams 104 that pass through a fuselage 54, a plurality of load transfer beams 122 disposed outside the fuselage 54, a cockpit window beam 136 that passes through the cockpit, and a plurality of support posts 48 and jacks 50 standing on a ground or floor outside the fuselage 54. As best seen in FIG. 10, the beams 104 protrude from openings formed by window frames 56 attached to the fuselage 54. Each load transfer beam 122 supports adjacent ends of a pair of beams 104. Each end of each pair of beams 104 is supported by a respective load transfer beam 122 for transferring the loads from the two beam ends to a respective support post 48.

Returning attention to FIG. 9, each support post is supported by a respective jack 50. The jacks 50 have built-in load cells for measuring the load carried by each jack 50. The jacks 50 may be tripod jacks commercially available from Malabar International, Inc., Simi Valley, Calif. The jacks 50 can be used to raise the beams 104 after each beam 104 has been coupled to the seat tracks 2, 4, 6, 8 by means of tool assemblies of the type previously described. Optionally, a cockpit window beam 136 can be passed through and protrudes from a pair of cockpit load transfer frames 52 (only one of which is visible in FIG. 9), which are installed in the cockpit window frames (not shown) to provide reinforcement and prevent damage to the window frames or surrounding fuselage. The cockpit window beam 136 can be raised by a pair of jacks 50 to assist in raising the aircraft.

It should be understood that the beams 104 support the aircraft structure by means of the couplings to the seat tracks 2, 4, 6, 8 which are attached to the floor beam grid structure (see FIG. 9) and not by means of the window frames 56. As seen in FIG. 10, the beams 104 need not contact the window frames 56.

While aircraft support apparatus has been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The method claims set forth hereinafter should not be construed to require that the steps recited therein be performed in alphabetical order (alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for supporting an aircraft structure comprising:
   (a) placing a beam so that one end protrudes out a first window opening on one side of a fuselage, another end protrudes out a second window opening on another side of the fuselage, and a portion of the beam inside the fuselage overlies a floor that is attached to the fuselage;
   (b) mechanically coupling the beam to seat tracks on the floor; and
   (c) raising the beam until at least a portion of the weight of the aircraft structure is supported by the beam via the mechanical coupling of the beam to the seat tracks.

2. The method as recited in claim 1, wherein the beam is raised by jacking a pair of support posts which support the opposing ends of the beam.

3. The method as recited in claim 1, wherein steps (a) through (c) are performed for each one of a multiplicity of beams.

4. The method as recited in claim 1, wherein step (b) comprises:
   coupling a load distribution plate to the beam;
   coupling first and second rails to first and second seat tracks respectively; and
   coupling the load distribution plate to the first and second rails.

5. The method as recited in claim 1, wherein step (a) comprises:
   placing a first beam segment so that one end protrudes out the first window opening on the one side of the fuselage and another end overlies the floor;
   placing a second beam segment so that one end protrudes out the second window opening on the other side of the fuselage and another end overlies the floor; and
   splicing the ends of the first and second beam segments that overlie the floor to each other.

6. The method as recited in claim 1, further comprising terminating step (c) before the rising beam exerts any force on respective window frames surrounding the first and second window openings.

7. An apparatus for supporting an aircraft structure comprising:
   a first beam having opposing ends;
   first and second support posts that support the opposing ends of said first beam;
   first and second jacks that respectively support said first and second support posts;
   a first load distribution plate coupled to and disposed below said first beam; and
   first and second rails coupled to and disposed below said first load distribution plate.

8. The apparatus as recited in claim 7, further comprising:
   a second beam having opposing ends;
   third and fourth support posts that support said opposing ends of said second beam;
   third and fourth jacks that respectively support said third and fourth support posts; and
   a second load distribution plate coupled to and disposed below said second beam and coupled to and disposed above said first and second rails.

9. The apparatus as recited in claim 7, further comprising:
   a second beam having opposing ends;
   a first load transfer beam that supports one opposing end of said first beam and one opposing end of said second beam, and is supported by said first support post;
   a second load transfer beam that supports the other opposing end of said first beam and the other opposing end of said second beam, and is supported by said second support post; and
   a second load distribution plate coupled to and disposed below said second beam, and coupled to and disposed above said first and second rails.

10. The apparatus as recited in claim 7, wherein said first load distribution plate is coupled to said first beam by means of a saddle, a hanger link coupled to said saddle, and a swivel coupled to said hanger link and to said first load distribution plate.

11. The apparatus as recited in claim 7, wherein said first beam comprises first and second beam segments and first and second splice plates attached to and connecting said first and second beam segments.

12. A system comprising an aircraft structure and a support apparatus, wherein said aircraft structure comprises a fuselage having respective multiplicities of window openings on opposite sides thereof, a floor attached to said fuselage, and first and second seat tracks attached to said floor, and wherein said support apparatus comprises:

a first beam arranged so that one end protrudes out a first window opening on one side of said fuselage, another end protrudes out a second window opening on another side of the fuselage, and a portion of the beam inside the fuselage overlies said floor;

first and second support posts that support said ends of said first beam;

first and second jacks that respectively support said first and second support posts; and first and second rails coupled to said first beam, said first rail being coupled to said first seat track and said second rail being coupled to said second seat track.

13. The system as recited in claim 12, wherein said first and second rails are coupled to said first beam by a tool assembly comprising a first load distribution plate that is coupled to said first and second rails.

14. The system as recited in claim 13, wherein said tool assembly further comprises a saddle in contact with said first beam, a hanger link coupled to said saddle, and a swivel coupled to said hanger link and to said first load distribution plate.

15. The system as recited in claim 12, further comprising:
a second beam having opposing ends;
third and fourth support posts that support said opposing ends of said second beam; and
third and fourth jacks that respectively support said third and fourth support posts,
wherein said first and second rails are coupled to said second beam.

16. The system as recited in claim 15, wherein said first and second rails are coupled to said first beam by a first tool assembly comprising a first load distribution plate that is coupled to said first and second rails and are coupled to said second beam by a second tool assembly comprising a second load distribution plate that is coupled to said first and second rails.

17. The system as recited in claim 12, further comprising:
a second beam having opposing ends;
a first load transfer beam that supports one opposing end of said first beam and one opposing end of said second beam, and is supported by said first support post; and
a second load transfer beam that supports the other opposing end of said first beam and the other opposing end of said second beam, and is supported by said second support post,
wherein said first and second rails are coupled to said second beam.

18. The system as recited in claim 17, wherein said first and second rails are coupled to said first beam by a first tool assembly comprising a first load distribution plate that is coupled to said first and second rails and are coupled to said second beam by a second tool assembly comprising a second load distribution plate that is coupled to said first and second rails.

19. The system as recited in claim 12, wherein said first beam comprises first and second beam segments and first and second splice plates attached to and connecting said first and second beam segments.

20. A method for lifting an aircraft structure comprising:
(a) supporting a plurality of beams on a plurality of support posts;
(b) mechanically coupling the plurality of beams to a plurality of seat tracks attached to a floor of the aircraft structure; and
(c) jacking the plurality of support posts until the plurality of beams exert forces on the plurality of seat tracks sufficient to lift the aircraft structure.

21. The method as recited in claim 20, wherein the aircraft structure comprises a fuselage to which the floor is attached, the fuselage having a first plurality of window openings on one side and a second plurality of windows on the other side, each beam of the plurality of beams passing through and protruding from a respective window opening of the first plurality of window openings and a respective window opening of the second plurality of window openings, the support posts being disposed outside the fuselage.

* * * * *